United States Patent [19]

Youngs

[11] Patent Number: 5,462,160
[45] Date of Patent: Oct. 31, 1995

[54] STORAGE CONTAINER WITH INTEGRAL FLAP

[75] Inventor: Ross O. Youngs, Dublin, Ohio

[73] Assignee: Univenture, Inc., Dublin, Ohio

[21] Appl. No.: 276,055

[22] Filed: Jul. 15, 1994

Related U.S. Application Data

[63] Continuation of Ser. No. 998,957, Dec. 31, 1992, abandoned.

[51] Int. Cl.$^6$ ............................ B65D 85/30; B65D 85/57
[52] U.S. Cl. ...................... 206/312; 206/309; 206/308.1; 383/66
[58] Field of Search ..................... 206/309, 312, 206/313, 472, 473; 383/38, 39, 66, 78, 81, 84; 386/86; 229/1.5 R, 76, 80, 84, 229; 150/152, 147

[56] References Cited

U.S. PATENT DOCUMENTS

| | | | |
|---|---|---|---|
| 3,004,659 | 10/1961 | Usher et al. | 206/313 |
| 3,422,952 | 1/1969 | George . | |
| 3,446,260 | 5/1969 | Osher . | |
| 3,459,361 | 8/1969 | Matton | 206/312 |
| 3,473,653 | 10/1969 | Nunes . | |
| 3,500,995 | 3/1970 | Forman | 383/38 |
| 3,688,898 | 9/1972 | Stanton . | |
| 3,722,564 | 3/1973 | Croon . | |
| 3,759,305 | 9/1973 | McIntyre | 383/66 |
| 3,864,755 | 2/1975 | Hargis . | |
| 4,076,874 | 2/1978 | Giovanelli et al. . | |
| 4,119,268 | 10/1978 | Segura | 383/903 |
| 4,197,949 | 4/1980 | Carlsson | 229/229 |
| 4,263,357 | 4/1981 | Holson . | |
| 4,327,831 | 5/1982 | Inaba et al. . | |
| 4,339,034 | 7/1982 | Panveno . | |
| 4,413,298 | 11/1983 | Pecsok et al. . | |
| 4,447,973 | 5/1984 | Wihlke . | |
| 4,473,153 | 9/1984 | Colangelo . | |
| 4,508,366 | 4/1985 | Brindle . | |
| 4,549,658 | 10/1985 | Sfikas . | |
| 4,610,352 | 9/1986 | Howey et al. . | |
| 4,620,630 | 11/1986 | Moss . | |
| 4,623,062 | 11/1986 | Chase et al. . | |
| 4,699,268 | 10/1987 | Oishi . | |
| 4,709,812 | 12/1987 | Kosterka . | |
| 4,762,225 | 8/1988 | Henkel | 206/309 |
| 4,850,731 | 7/1989 | Youngs | 206/313 |
| 4,871,046 | 10/1989 | Turner | 383/66 |
| 5,396,987 | 3/1995 | Temple et al. | 206/312 |

Primary Examiner—Paul T. Sewell
Assistant Examiner—Marie Denise Patterson
Attorney, Agent, or Firm—Wood, Herron & Evans

[57] ABSTRACT

A compact disc storage container for single compact discs, having storage locations for identifying graphics and a graphics in booklet form. The compact disc storage container includes a flexible sheet, preferably transparent, which is cut to form a flap, the cut terminating at two ends and having arcuate regions adjacent the ends. The arcuate regions resist tearing as the flap is opened to insert and remove the compact disc from the compact disc storage container.

43 Claims, 2 Drawing Sheets

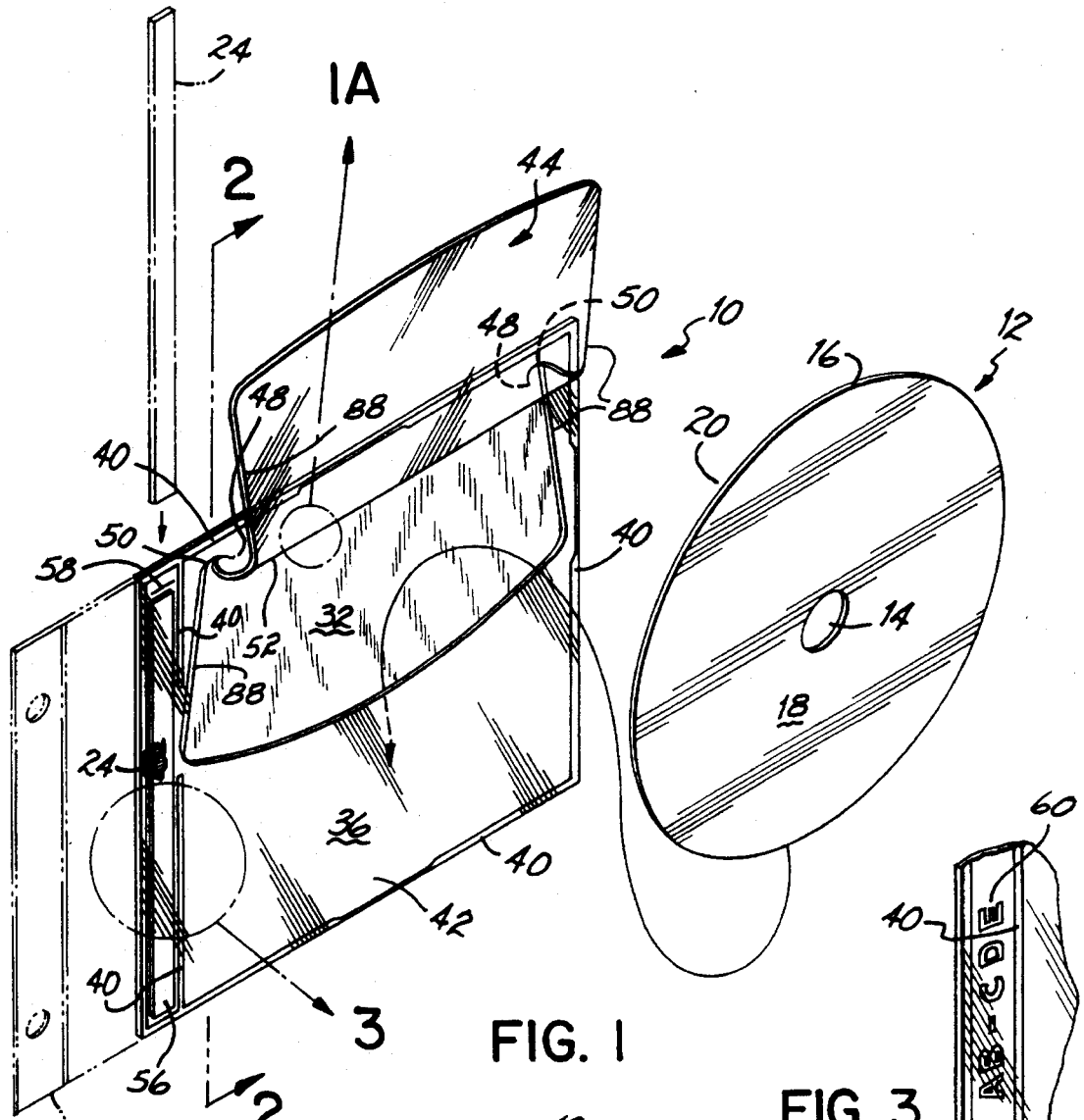
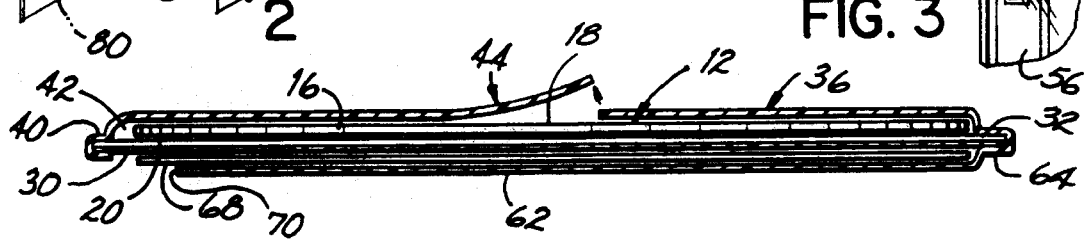

STORAGE CONTAINER WITH INTEGRAL FLAP

This application is a continuation of application Ser. No. 07/998,957, filed Dec. 31, 1992, now abandoned.

FIELD OF THE INVENTION

The invention relates to devices for storing compact discs which provide improved visibility for the compact disc and accompanying graphics and ready access to the compact disc, with minimized risk of damage to the optical surface of the compact disc.

BACKGROUND OF THE INVENTION

The introduction of the compact digital audio disc (CD) has resulted in a true advance in audio program playback technology. The CD contains a digitally encoded rendering of the program audio signal transferred onto a disc of polycarbonate plastic by molding or stamping. The encoded surface is then uniformly coated with aluminum and coated with a sealant such as lacquer. The aluminum sputtering on the stamped surface creates a reflective surface which is read by a laser beam through the opposite side of the polycarbonate disc. The laser reflection is converted to an audio signal which is heard through standard audio playback components.

The CD is considered a substantial advance over the vinyl record album for several reasons. First, the CD is capable of storing considerably more audio program material per unit area than a vinyl album. This permits the use of a much smaller disc for the presentation of recorded music (hence the term "compact" disc). Next, the ability to retain an audio program capable of being digitally decoded results in a substantial improvement in signal to noise ratio and program fidelity when compared with a vinyl record. Finally, the use of a laser beam as the transducer results in little if any degradation of the CD playing surface during playback. The playback properties of the CD will thus remain essentially unchanged, even after extensive use. However, there are factors which interfere with the reflection of the laser beam from the aluminum sputtered surface and adversely affect CD playback performance. Several such factors are scratches, dust, and fingerprints.

Because of the need to protect the surface of the CD through which the laser reflects, i.e., the optical surface, various CD storage devices have been developed to address this problem. By far the most prevalent storage device is a package known as the jewel box. The jewel box consists of two pieces of molded polycarbonate which are hinged along a common side to permit the opening of the box as one would open a book. Snap fit inside one of the polycarbonate pieces is a styrene tray with a center hub which engages the center aperture of the CD. The jewel box is slightly larger than the 12 cm diameter of the CD. Though the jewel box serves to protect the CD, the box itself suffers from certain disadvantages. The box is difficult to open, and it is difficult to remove the CD from the centered hub without bending the CD. The jewel box is relatively fragile, resulting in breakage of the hinges or the polycarbonate pieces themselves when accidentally dropped. Finally, the jewel box is expensive to manufacture because of the three piece construction and the need to manually assemble the parts.

One alternative to the jewel box for use in after-market storage of the CD is a device known as the CD Jockee produced by DataPax, Kennewick, Wash. The CD Jockee is a CD carrying case which opens into an A-frame shape and has eight two-sided, clear vinyl pockets that can carry up to 16 compact discs. The pockets are connected in an overlapping fashion, such that only a small portion of the discs underlying the top disc can be seen. The individual pockets have a clear vinyl front to permit viewing of the side of the CD containing identifying printing, and a velour back which contacts the optical surface of the CD. The reverse side of each pocket can hold the printed graphics accompanying the CD stored on the front, or alternatively it may be used to store another CD. The CD Jockee has the disadvantages that when the compact discs are displayed, the discs themselves are exposed to dust because of the open top access to the discs. Further, when displayed, one must typically flip through each pocket to find the desired CD because only a small portion of the printed surfaces are visible. Also, the velour surfaces generate relatively large amounts of lint which can accumulate on the optical surfaces of the discs.

Yet another alternative to the jewel box is the CD storage container described in U.S. Pat. No. 4,850,731, which is incorporated herein by reference. The CD storage container described therein for single discs is comprised of a backing sheet, a nonwoven fabric joined to the backing sheet, a transparent front sheet over the nonwoven fabric and a pocket-forming sheet which extends over the transparent front sheet to form a flap which protects both the stored CD and the graphics. Upon folding back the flap, one can remove the CD by simultaneously accessing the aperture and edge of the CD. This allows removal of the CD without the need to touch the optical surface. The '731 patent also discloses a sheet which can store at least two discs thereon. The CD is stored in a pocket which leaves exposed the aperture and a portion of the edge of the CD to permit removal without touching the optical surface of the CD. Though both the single disc and multiple disc storage containers provide excellent protection for the CD, the containers have certain limitations. The single CD container has a flap which overlays the entire storage area. The length and weight of the flap helps to ensure that the portion of the CD not in contact with the transparent front sheet nonetheless remains covered. However, to be effective the flap requires the use of excess plastic film. The multiple CD storage container provides relatively good protection for the CD, but doesn't cover the entire printed surface, relying on adjacent pages to provide coverage.

SUMMARY OF THE INVENTION

The invention relates to a flexible container for storing both a CD and its accompanying graphics. The container is comprised of a first flexible sheet to which is joined a nonwoven fabric sheet, with an overlying second flexible sheet joined to the first flexible sheet through the nonwoven fabric. Joining in this fashion, typically by partial melting of the first and second flexible sheets, improves the structural integrity of the container. The bonding between the first flexible sheet, the second flexible sheet and the nonwoven fabric is configured to provide an area sufficient in size to store a CD. Access to this storage area is provided by a flap cut into the second flexible sheet within the boundary of the bond to permit insertion of the CD into the storage area so that the optical surface of the CD contacts the nonwoven fabric. The flap is cut so that it is possible to simultaneously access the aperture and the edge of the CD to facilitate removal from the storage area. Preferably, the cut of the flap is designed to also provide access to either the edge of the CD at two points or to both the front and obverse of the aperture to allow removal of the CD without touching the optical surface, if desired. When the flap is positioned over the CD, there is essentially a continuous single-thickness surface overlaying the CD to provide protection using the minimum amount of sheeting material.

One important feature of the invention is the arrangement and shape of the flap. The flap is cut into the second flexible sheet, which preferably is transparent to permit direct viewing of the CD graphics, so that upon opening of the flap at least a portion of the CD aperture is exposed. Near the terminus of the cut on opposite sides of the flap are two arcuate portions. As the flap is opened and pulled back to allow access to the CD, the opening force becomes directed along a hinge line substantially between the terminus points due to the inclusion of the arcuate portions. Without the arcuate portions, opening of the flap would place strain only on that portion of the second flexible sheet directly beyond the terminus points. In this latter situation, opening the flap tends to rip the flexible sheet beyond the terminus points, thereby damaging the CD storage container.

Preferably, the flap is widest along the opening line, which is proximate to the aperture of the CD and is substantially parallel to the hinge line. Continuing along the flap cut from the opening line toward the hinge line, the side to side distance of the flap decreases. The flap, by incorporating the arcuate portions, has a slight resistance to opening which thereby tends to maintain the flap in a closed position to better protect the CD from dust and other particulate contamination during storage. Further, the particular flap shape discussed above allows the CD to be slid into and out of a container having minimum dimension. It can be seen, however, that a flap with the opening line having a length equal to or smaller than that of the line between the terminus points can also be formed. However, the resulting CD storage container would be of larger dimension as a result, or would not allow access to the CD as easily.

Along one side of the container perpendicular to the hinge line is an optional rectangular storage area which is designed to either receive identifying graphics, such as those presently displayed on the spine of the jewel box storage container, or to be printed or embossed on directly as a means of identifying the CD. As a further option, the container can include an additional section either along an edge perpendicular to the hinge line, or opposite the hinge line which can be hole-punched or otherwise modified to permit storage of the container in a ring binder or other storage device.

It is an object of this invention to provide a CD storage sleeve which protects the optical surface of the CD from dust, scratches and lint.

It is a further object of this invention to provide a smooth-sided storage pocket for the graphics accompanying the CD.

It is a further object of this invention to provide a CD storage container having a flap which resists tearing when open.

It is yet a further object of the invention to provide a container which stores identifying graphics for ready identification of the CD.

It is yet a further object of this invention to provide a CD storage container having a flap which tends to stay in the closed position to thereby form an essentially continuous surface over the CD which minimizes contact with contaminating particulate matter.

It is yet a further object of the invention to provide a CD storage container which allows simultaneous access to the edge and aperture of the CD, or alternatively to either two points on the edge or to the front and obverse of the aperture to facilitate insertion and removal.

These and other objects and advantages will become readily apparent from the following detailed description of the invention and from the drawings in which:

BRIEF DESCRIPTION OF THE DRAWINGS

FIG. 1 is a front perspective view of the storage container with integral flap depicting the storage location for the CD and identifying graphics.

FIG. 1A is an exploded view of the encircled area 1A of FIG. 1 of the construction of the sheets comprising the storage container.

FIG. 2 is a cross-sectional view taken in lines 2—2, of FIG. 1 with the flap in an essentially closed position, with the CD and graphics stored therein.

FIG. 3 is an exploded view of the encircled area 3 of FIG. 1 of a section of the graphics storage area with an alternative labelling method.

DETAILED DESCRIPTION OF THE INVENTION

Figure 4:
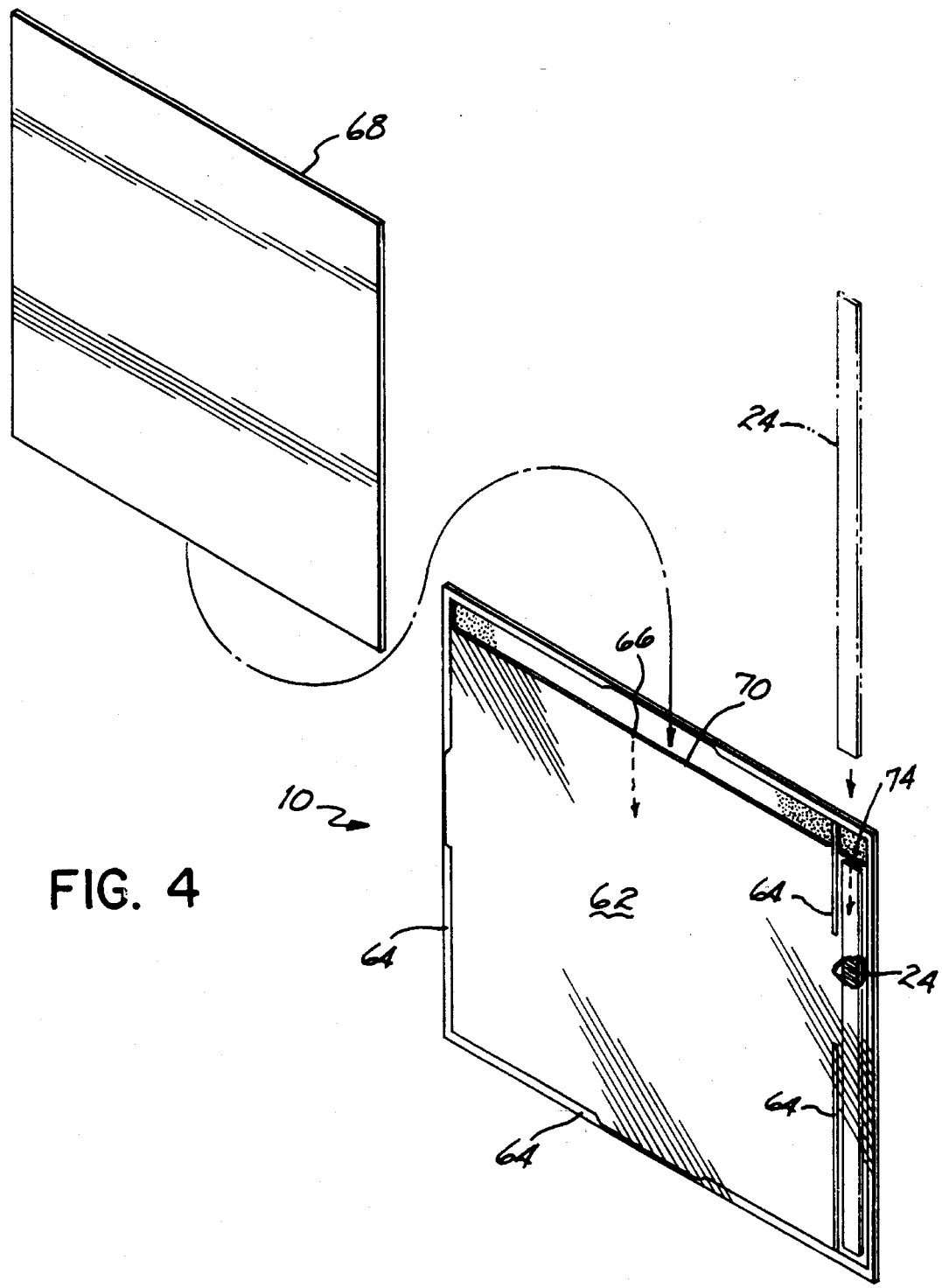
FIG. 4 is a rear perspective of the storage container with integral flap depicting the storage positions of the graphics and identifying graphics.

The invention in its broader aspects relates to a compact disc storage container comprising a first flexible sheet; a nonwoven fabric sheet overlaying the first flexible sheet; and a second flexible sheet overlaying the nonwoven fabric sheet opposite the first flexible sheet and joined to the first flexible sheet through the nonwoven fabric sheet to define a CD storage area, the flexible sheet having a cut to define a flap portion which hinges along a hinge line to access the CD storage area, the cut terminating at two ends and having arcuate regions adjacent the ends, whereby the arcuate regions resist tearing of the flap at the ends when accessing the CD storage area. Where it is desired to store the graphics accompanying the CD, a reverse sheet is added to the container construction, joined to the first flexible sheet opposite the nonwoven fabric sheet along three sides to define a pocket for storage. The identifying graphics normally seen on the spine of a storage container such as the jewel box can be stored in the storage container in a section adjacent the CD storage area, or adjacent the graphics pocket on the reverse side of the storage container.

It is preferred that the first flexible sheet of the container be produced from polyvinylchloride, hereinafter referred to as vinyl. Polyvinylchloride (vinyl) is a thermoplastic polymer having an average molecular weight in the range of about 60,000 to about 150,000 g/mole. Vinyl is typically available as a white powder which can be converted into sheets or films. Vinyl is sold by various manufacturers under a number of trademarks, such as "GEON" resins by B. F. Goodrich Chemical Co. The vinyl employed in carrying out the teachings of this invention is of the type typically used to prepare films and sheets. Generally, such vinyl has an inherent viscosity in the range of about 0.70 to about 1.30, as determined by ASTM Method D-1243. To impart flexibility to the vinyl, plasticizer is added. The amount of plasticizer added affects the tensile and elastic properties of the vinyl sheet, otherwise designated as the "hand" of the sheet. The hand of a sheet serves as a shortened description of the textural qualities of the sheet, and is represented by "S and H" values. Larger "S" numbers indicate a more flexible or tacky sheet. Larger "H" numbers indicate a stiffer sheet. The table below sets out typical hand values for vinyl sheet utilized according to this invention, with accompanying plasticizer levels and specific gravities of the sheets.

TABLE 1

| Hand | 2S | 3S | 4S | 2H | 3H |
|---|---|---|---|---|---|
| PHR* | 40 | 44 | 48 | 29 | 25 |
| Specific Gravity | 1.30 | 1.30 | 1.28 | 1.29 | 1.30 |

*Parts plasticizer per 100 parts resin

The container includes a second flexible sheet, typically made of vinyl, which includes the flap, which preferably permits simultaneous access to the edge and aperture of the CD stored in the container. The simultaneous access permits the user to grasp the CD using only the thumb and the fingers so that the optical surface of the disc receives no fingerprints or smudges which would interfere with the playback characteristics of the disc. In this way the optical surface of the disc tends to remain in close relation to the nonwoven fabric joined to the first flexible sheet and results in reduced accumulation of dust and other contaminants from outside the container. Vinyl is employed as the preferred material because, among other properties, it can be used to produce either a clear or color-containing sheet, it is durable and it is chemically inert to the CD. However, other polymeric materials also have these properties, and it is contemplated that other materials may also be employed, such as certain polyesters and polypropylene for example.

The nonwoven fabric of the composite sheet is produced preferably from polyester fiber. A specific example of the fiber anticipated for use in this invention is "SONTARA-" spunlaced fabric produced by E. I. DuPont De Nemours and Company, Inc. "SONTARA" fabric is a bulky, soft, strong, conformable light weight sheet made of hydraulically interlaced fibers with no chemical or thermal bonding. The polyester fibers used to produce a "SONTARA" fabric sheet are softer than cellulosic fibers such as cotton or paper. Thus, the optical surface of a CD is less likely to be scratched by the polyester nonwoven sheet. Though the polyester fabric is preferred, it is contemplated that other nonwoven fabrics joinable to a first flexible sheet may also be used, such as nonwoven polypropylene.

It is preferred that the front sheet of the container be transparent to achieve maximum visibility of the printed surface of the CD. It is preferred that the reverse sheet also be transparent to achieve maximum visibility of the graphics. The first flexible sheet may be produced as a clear sheet, a matte sheet or a color-added sheet.

Referring to the drawings, FIG. 1 depicts the front side of the compact disc storage container 10 into which can be inserted the compact disc 12, having an aperture 14, an edge 16, a printed surface 18, and an optical surface 20.

The multilayer construction of the compact disc storage container 10 is seen in FIG. 1, FIG. 1A and in the cross-sectional view of FIG. 2. The compact disc storage container 10 is comprised of a first flexible sheet 30 which is joined to a nonwoven fabric sheet 32. The nonwoven fabric sheet 32 is preferably joined over its entire surface to the first flexible sheet 30, though partial joining is acceptable where the nonwoven fabric sheet 32 is rendered sufficiently stable to contact the compact disc 10 through repeated storage-removal sequences without pulling or snagging. The joining is effected typically by passing the first flexible sheet 30 and nonwoven fabric sheet 32 through a nip roller in a calendaring process. Heat is applied to partially melt the first flexible sheet 30 into the fibers of the nonwoven fabric sheet 32. This heat lamination fixes the nonwoven fabric sheet 32 onto the first flexible sheet 30, and decreases the possibility of snagging, tearing, or pulling the nonwoven fabric sheet 32. Heat for the heat lamination operation described throughout this invention is provided typically by radio frequency radiation, encompassing high frequency and electrostatic sealing methods, or alternatively by thermal or ultrasonic radiation. The first flexible sheet 30 is preferably vinyl, having a sheet thickness of about 0.015 cm, a hand of 2S and a melting point in the range of about 121° C. to about 177° C. The vinyl first flexible sheet 30 has an acceptable thickness in the range of about 0.0076 cm to about 0.02 cm, preferably in the range of about 0.01 cm to about 0.015 cm. The vinyl first flexible sheet 30 has an acceptable hand in the range of 2S to 4S. The preferred nonwoven fabric, "SONTARA" polyester, melts at about 254° C. The "SONTARA" polyester fabric is available in a variety of usable styles, but the preferred fabric style is designated as "8001", having as typical properties a unit weight of 23.7 g/m$^2$, a thickness of 0.028 cm, a Mullen Burst Value of 23 psi, and a Frazier Air Permeability of 600 CFM/ft$^2$ at 0.5 inch H$_2$O. Alternatively, other methods of joining the nonwoven fabric sheet 32 to the first flexible sheet 30 may be utilized, such as by adhesives, chemical modification, or extrusion coating/laminating of the mating surfaces. The primary requirement of the first flexible sheet 30 is to serve as a securing member for the nonwoven fabric sheet 32 so that a compact disc 12 can be inserted and removed from the compact disc storage container 10 numerous times without degrading the nonwoven fabric sheet 32. Also, the first flexible sheet 30 serves as a component for the pocket which receives the written graphics associated with the compact disc 12, which will be discussed in more detail below.

The second flexible sheet 36 is preferably clear or transparent, is positioned over the nonwoven fabric sheet 32 and is joined to the first flexible sheet 30 through the nonwoven fabric sheet 32 along substantially the entire length of all four peripheral edges 40 to define a compact disc storage area 42 into which the compact disc 12 can be inserted. Means for providing access into the compact disc storage container 10 so that the optical surface 20 of the compact disc 12 can be stored in contact with the nonwoven fabric sheet 32 is provided by cutting the second flexible sheet 36 in a manner which forms a flap 44 without cutting the nonwoven fabric sheet 32. One method of forming the flap 44 involves positioning the second flexible sheet 36 over nonwoven fabric sheet 32 and first flexible sheet 30 and bonding the two flexible sheets 30 and 36 through nonwoven fabric sheet 32 before the cutting of the flap. This cutting operation is known as a kiss cut, which utilizes a cutting die to form the flap without affecting the nonwoven fabric sheet 32 below. Presently, it is more efficient to form the flap 44 in second flexible sheet 36 by die cutting the second flexible sheet 36 prior to positioning over nonwoven fabric sheet 32 and joining. Because the operation joining the two flexible sheets 30 and 36 occurs after die cutting, the peripheral edges 40 are preferably formed in a manner which takes into account the possibility for slight misalignment of the second flexible sheet 36 either during die cutting or upon positioning over nonwoven fabric sheet 32 after die cutting. This modified peripheral edge 40 can be seen in FIG. 1 near the widest part of the flap 44, where the sections of the peripheral edges 40 nearest flap 44 are indented away from the flap 44. Where the compact disc storage area 42 dimensions are increased, the peripheral edges 40 can be formed without indents, though the dimension of the compact disc storage container 10 would typically increase as a result.

The flap 44 which is cut into second flexible sheet 36 is distinguished by the shape of the cut near the ends 48. As shown in FIG. 1, the flap 44 has arcuate regions 50 which are adjacent the ends 48. This feature of the flap 44 produces several advantages for the compact disc storage container 10. First, the arcuate regions 50 in the cut tend to resist tearing when the flap 44 is pulled away from the stored compact disc 12. The arcuate regions 50 in the cut tend to distribute the opening tension more evenly along a hinge line 52 which is essentially parallel to or coextensive with an imaginary line drawn between the ends 48. If the flap 44 terminated at two points along cut lines which lie in the same direction of the force used for opening of the flap 44, without the presence of the arcuate regions 50, the pulling force would be focused directly on the termination points. Without the additional surface of the flap 44 along the hinge line 52 to absorb the pulling force, the flexible sheet beyond the termination points of the flap without arcuate regions would be more susceptible to additional tearing. Further, terminating the cut with the arcuate regions 50 displaced some slight distance away from the peripheral edge 40 of the compact disc storage container 10 assists in providing resistance to opening the flap 44. This resistance provides for a "memory" which facilitates the closing of the flap 44, tending to keep the flap 44 in a closed position to better maintain a dust-free containment area for the compact disc 12.

The joining of the second flexible sheet 36 to the first flexible sheet 30 through nonwoven fabric sheet 32 is effected preferably by heat lamination, as discussed above. Typically, the peripheral edges 40 are formed by utilizing radio frequency radiation to cause the melting necessary to form the bond, though other methods of joining by inducing partial melting may be employed. Alternative methods include but are not limited to joining by adhesives or chemical modification. The second flexible sheet 36 is preferably vinyl having a sheet thickness of about 0.015 cm, a hand of 2H, and a melting point in the range of about 121° C. to about 177° C. The vinyl second flexible sheet 36 has an acceptable thickness in the range of about 0.01 cm to about 0.02 cm. The second flexible sheet 36 has an acceptable hand in the range of 2H to 3H. It is preferred that the optical surface 20 of the compact disc 12 lie in close relation to the nonwoven fabric sheet 32 to minimize the possibility of scratching or accumulation of dust. The printed surface 18 is then visible through the second flexible sheet 36, permitting ease of identification of the compact disc 12.

The compact disc storage container 10 may also include an area adjacent the compact disc storage area 42 for retaining identifying graphics 24. The identifying graphics storage area 56 is formed from a continuation of the first flexible sheet 30, nonwoven fabric sheet 32 and second flexible sheet 36, separated from the compact disc storage area 42 by a joint line separation typically formed by heat treatment to partially melt the flexible sheets 30 and 36 together through nonwoven fabric sheet 32, such as by radio frequency radiation. The identifying graphics storage area 56 is accessed via slit 58. The dimensions of the identifying graphics storage area 56, typically about 12.3 centimeters long and 0.8 centimeters wide, are sufficient to accept the spine graphics from a conventional jewel box, which typically includes the name of the performing artist and title of the CD, the label, and a CD identification number. When stored with other compact disc storage containers 10, the identifying graphics 24 in identifying graphics storage area 56 allow for easy identification of the desired compact disc 12 without having to actually view the individual printed surfaces 18 of the stored compact discs 12. Because the identifying graphics 24 have a more standardized print format than that found on the printed surface 18 of the compact disc 12, the desired CD can be more readily identified without the need to disturb the flap 44, which movement tends to increase the amount of dust and particles which can enter the compact disc storage area 42. Alternatively, if the compact disc storage container 10 is to be used only with a single compact disc 12, the identifying graphics storage area 56 can be printed upon directly with the necessary information, or it can alternatively be embossed with the identifying information. This alternate method of identifying the compact disc storage container 10 is shown in FIG. 3, with identifying indicia 60.

As shown in FIG. 4, the reverse side of the compact disc storage container 10 includes a reverse sheet 62 which overlays the first flexible sheet 30 and is joined along three peripheral edges 64 to define a pocket 66 into which the graphics 68 is inserted. The joining is effected preferably by partial melting of the first flexible sheet 30 and reverse sheet 62 along the edges by heat lamination operation, but alternative joining means can be employed. The reverse sheet 62 is preferably vinyl having a sheet thickness of about 0.015 cm, a hand of 2H and a melting point of about 121° C. The acceptable ranges for the thickness and hand of the vinyl reverse sheet 62 are about 0.01 cm to about 0.02 cm and 2H to 3H, respectively. Along the nonjoined edge 70 is an opening which permits placement of the graphics 68 into pocket 66 formed by the peripheral edges 64. The reverse sheet 62 is preferably transparent to permit maximum visibility of the graphics 68 through the sheet itself.

Adjacent the pocket 66 for the graphics 68 is a reverse side identifying graphics storage area 74 similar to that shown on the front side of the compact disc storage container 10. The reverse side identifying graphics storage area 74 is defined by a joint line formed typically by heat lamination of the reverse sheet 62 to the first flexible sheet 30.

As depicted in phantom in FIG. 1, the compact disc storage container 10 can also include an end portion 80 comprised of a continuation of the layers respectively of reverse sheet 62, first flexible sheet 30, nonwoven fabric sheet 32 and second flexible sheet 36, which may be hole-punched to permit storage in a ring binder. Other types or means for binding discrete compact disc storage containers 10 may also utilize the end portion 80, with or without hole punching to create a booklet of compact disc storage containers 10.

The flap 44 of the compact disc storage container 10 is cut in a manner which allows access to the edge 16 and aperture 14 of the compact disc 12 simultaneously, or alternatively either to the edge 16 at two points sufficiently distant to permit removal of the compact disc 12 or to the front and obverse of the aperture 14 without contacting the optical surface 20. The arcuate regions 50 are shown in FIG. 1 to have ends 48 which terminate to the inside of the cut which forms the flap 44. Alternatively, the ends 48 may terminate outward of the cut forming the flap 44. It has been found that good results are obtained when the arcuate regions 50 extend through an arc in the range of about 90 degrees to about 270 degrees. Preferably the arc is about 180 degrees. The arc is defined as originating at a point tangent to one of the lateral cut lines 88 along which the flap 44 is opened. It is important that the ends 48 and arcuate regions 50 of the cut which forms the flap 44 terminate some distance from the peripheral edge 40 of the compact disc storage container 10. The peripheral edge 40 formed by joining the first flexible sheet 30 and second flexible sheet 36 through the nonwoven fabric sheet 32 is susceptible to separation if sufficient force is applied along the peripheral edge 40. If the cut terminates at this peripheral edge 40, tearing along the peripheral edge across the width of the flap can occur with little additional separating force.

It is contemplated that the polymeric material utilized in the invention may also have incorporated therein a variety of chemical additives such as antistatic compounds, ultra-violet radiation absorbers, plasticizers, and the like which improve the use characteristics of the compact disc storage container 10 without adversely affecting the compact disc 12 or graphics 24 and 68.

The compact disc storage container 10 is intended for sale as either an original storage package for a compact disc 12 or as a replacement for the standard configuration jewel box. The compact disc storage container 10 can be enclosed in a plastic packing presently used to display the compact disc 12 at record stores. Because the compact disc storage container 10 is thinner than the jewel box, packaging can be produced which will require less space, permitting more selections to be displayed in a unit area than is presently possible through the utilization of the jewel box alone. The dimensions of the compact disc storage container 10 for a standard 12 cm diameter disc are about 12.8 cm high by about 14.2 cm wide, where the identifying graphics portion is included. Where the compact disc storage container 10 includes an end portion 80 for hole punching or other end binding for placement into a booklet, the length increases to approximately 18.1 cm. The compact disc storage container 10 is less susceptible to damage than the jewel box. The compact disc storage container 10 containing both a CD and graphics can be accidentally dropped onto the floor typically without damage to the storage container 10 or the CD. The flexible components of the compact disc storage container 10 tend to absorb shock without transmitting it to the compact disc 12.

Presently, compact discs contain recording material on only one side of the disc. It is contemplated that advances in technology, coupled with an increased need to maximize storage density per unit area of disc surface, will result in discs containing storage space on both sides of the disc. It can be appreciated that with minor modification, a CD storage container can be manufactured having nonwoven fabric disposed against both surfaces of the CD. The invention is also equally applicable for storage of discs having both larger and smaller diameters than the commonly available 12 cm diameter discs. The identifying graphics would amply serve to identify the CD even where no identifying information is readily viewable on either side of the CD.

The invention has been described only in the context of storing compact discs. However, the invention can also be used for record storage, photo storage, optical disc storage and the like.

What is claimed is:

1. A storage container for storing a compact disc having an aperture and an edge, comprising:
   a first flexible sheet;
   a nonwoven fabric sheet overlaying said first flexible sheet; and
   a second flexible sheet overlaying said nonwoven fabric sheet opposite said first flexible sheet and joined to said first flexible sheet through said nonwoven fabric sheet to define a compact disc storage area, said second flexible sheet having a cut to define a flap portion which hinges along a hinge line and opens along an opening line to allow access to said compact disc storage area, said flap portion having a width that decreases in a direction toward said hinge line and said cut terminating at two ends and having arcuate regions adjacent said ends, whereby said arcuate regions resist tearing of said flap portion at said ends when accessing said compact disc storage area.

2. The storage container of claim 1 further comprising a reverse sheet joined to said first flexible sheet opposite said nonwoven fabric sheet along three sides thereof to define a pocket for retaining graphics therein.

3. The storage container of claim 1 further comprising a storage area affixed along and adjacent a side edge of said compact disc storage area for retaining identifying graphics.

4. The storage container of claim 1 further comprising a fastening portion connected to said compact disc storage area for securing said storage container in a display and storage book.

5. The storage container of claim 1 further comprising a hole-punched portion adjacent to said compact disc storage area to allow said storage container to be retained in a ring binder.

6. The storage container of claim 1 wherein said nonwoven fabric sheet is produced from polyester film.

7. The storage container of claim 1 wherein said second flexible sheet is transparent.

8. The storage container of claim 7 wherein said transparent second flexible sheet is produced from vinyl.

9. The storage container of claim 1 wherein said flap portion extends from said hinge line at least to an approximate center point of said compact disc storage area to overlie at least a portion of the aperture of said compact disc when said compact disc is fully received in said compact disc storage area thereby permitting simultaneous access to both the edge and aperture of said compact disc upon opening of said flap portion.

10. The storage container of claim 1 wherein said second flexible sheet is joined to said first flexible sheet through said nonwoven fabric sheet by heat lamination.

11. The storage container of claim 2 further comprising a storage area affixed along and adjacent a side edge of said pocket for retaining identifying graphics.

12. The storage container of claim 1 wherein said arcuate regions sweep an arc of about 90 degrees to about 270 degrees.

13. The storage container of claim 1 wherein said arcuate regions sweep an arc of about 180 degrees.

14. A combination including a storage container and a compact disc having an aperture and an edge, wherein said storage container comprises:
   a first flexible sheet;
   a nonwoven fabric sheet overlaying said first flexible sheet; and,
   a second flexible sheet overlaying said nonwoven fabric sheet opposite said first flexible sheet and joined to said first flexible sheet through said nonwoven fabric sheet to define a compact disc storage area in which said nonwoven fabric sheet to define a compact disc storage area in which said compact disc is disposed, said second flexible sheet having a cut to define a flap portion which hinges along a hinge line and opens along an opening line to allow access to said compact disc storage area, wherein said flap portion has a width that decreases in a direction toward said hinge line and extends from said hinge line a distance sufficient to overlie at least a portion of the aperture of said compact disc thereby permitting simultaneous access to both the edge and aperture of said compact disc upon opening of said flap portion.

15. The combination as claimed in claim 14 wherein said hinge line is positioned so as to be essentially tangential to the edge of said compact disc.

16. The combination as claimed in claim 14 wherein said flap portion has a width that decreases in a direction toward said hinge line.

17. A storage container for storing a compact disc having an aperture and an edge, said storage container comprising:

a first flexible sheet;

a nonwoven fabric sheet overlaying said first flexible sheet; and, a second flexible sheet overlaying said nonwoven fabric sheet opposite said first flexible sheet and joined to said first flexible sheet through said nonwoven fabric sheet to define a compact disc storage area for holding said compact disc, said second flexible sheet having a cut to define a flap portion which hinges along a hinge line and opens along an opening line to allow access to said compact disc storage area, said flap portion having a width that decreases in a direction toward said hinge line.

18. The storage container of claim 17 wherein said flap portion extends from said hinge line at least to an approximate center point of said compact disc storage area to overlie at least a portion of the aperture of said compact disc when said compact disc is fully received in said compact disc storage area thereby permitting simultaneous access to both the edge and aperture of said compact disc upon opening of said flap portion.

19. A storage container for storing a compact disc having an aperture and an edge, comprising:

a first flexible sheet;

a nonwoven fabric sheet overlaying said first flexible sheet;

a second flexible sheet overlaying said nonwoven fabric sheet opposite said first flexible sheet and joined to said first flexible sheet with said nonwoven fabric sheet disposed therebetween to define a compact disc storage area between said nonwoven fabric sheet and said second flexible sheet, said storage area being bound at its sides by first seals at first peripheral edges and a second seal at the top peripheral edge, said second flexible sheet having a generally "U"-shaped cut to define an access opening to said compact disc storage area, the ends of said cut each extending from a location adjacent said second seal to a location approximately in a center of the storage area; and, an elongate graphics storage pocket extending along and peripherally outside of one of said first peripheral edge of said compact disc storage area, said graphics storage pocket being formed from flexible sheets of material overlying each other and being connected together to form the graphics storage pocket therebetween, said graphics storage pocket further including a graphics insert opening for receiving an elongate strip of graphics.

20. The storage container of claim 19 wherein said graphics storage pocket is bounded by a first seal disposed adjacent said first peripheral edge, a second seal formed generally parallel to and spaced from said first seal and formed between the flexible sheets forming the graphics storage pocket, and third and fourth seals formed between the flexible sheets forming the graphics storage pocket and located at respective first and second ends of said graphics storage pocket, said third and fourth seals extending generally between said first and second seals.

21. The storage container of claim 20 wherein said graphics insert opening is located at one of said first and second ends of said graphics storage pocket.

22. The storage container of claim 20 wherein the third seal is generally in line with a first compact disc storage area seal formed between said first and second flexible sheets with said nonwoven fabric sheet therebetween and defining a second peripheral edge of said compact disc storage area which is substantially perpendicular to said first peripheral edge.

23. The storage container of claim 20 wherein the fourth seal is generally in line with a second compact disc storage area seal formed between said first and second flexible sheets with said nonwoven fabric sheet therebetween and defining a third peripheral edge of said compact disc storage area which is substantially perpendicular to the first peripheral edge and substantially parallel to the second peripheral edge.

24. The storage container of claim 19 wherein said graphics storage pocket is formed by respective extensions of said first flexible sheet, said second flexible sheet and said nonwoven fabric sheet.

25. A storage container for storing a compact disc having an aperture and an edge, comprising:

a first flexible sheet;

a nonwoven fabric sheet overlaying said first flexible sheet;

a second flexible sheet overlaying said nonwoven fabric sheet opposite said first flexible sheet and joined to said first flexible sheet with said nonwoven fabric sheet disposed therebetween to define a compact disc storage area between said nonwoven fabric sheet and said second flexible sheet, said storage area being bound at its sides by first seals at first peripheral edges and a second seal at the top peripheral edge, said second flexible sheet having a generally "U"-shaped cut to define an access opening to said compact disc storage area, the ends of said cut each extending from a location adjacent said second seal to a location approximately in a center of the storage area; and, a graphics storage pocket formed adjacent to one of said first peripheral edge of said compact disc storage area, said graphics storage pocket being formed by an extension of said first flexible sheet extending peripherally outside said first peripheral edge and an overlying sheet portion affixed to the extension of said first flexible sheet to form said graphics storage pocket therebetween, said graphics storage pocket further including a graphics insert opening for receiving an elongate strip of graphics.

26. The storage container of claim 25 wherein said graphics insert opening is contained in said overlying sheet portion.

27. The storage container of claim 25 wherein said graphics storage pocket is bounded by a first seal formed between the extension of said first flexible sheet and said overlying sheet portion adjacent sad first peripheral edge, a second seal generally parallel to and spaced from said first seal and formed between the extension of said first flexible sheet and said overlying sheet portion, and third and fourth seals formed between the extension of said first flexible sheet and said overlying sheet portion at respective first and second ends of said graphics storage pocket and extending generally between said first and second seals.

28. The storage container of claim 27 wherein said graphics insert opening is located at one of said first and second ends of said graphics storage pocket.

29. The storage container of claim 27 wherein the third seal is generally in line with a first compact disc storage area seal formed between said first and second flexible sheets with said nonwoven fabric sheet therebetween and defining a second peripheral edge of said compact disc storage area which is substantially perpendicular to said first peripheral edge.

30. The storage container of claim 27 wherein the fourth seal is generally in line with a second compact disc storage area seal formed between said first and second flexible sheets with said nonwoven fabric sheet therebetween and defining a third peripheral edge of said compact disc storage area which is substantially perpendicular to the first peripheral edge and substantially parallel to the second peripheral edge.

31. The storage container of claim 25 wherein said graphics storage pocket is further formed by an extension of said nonwoven fabric sheet, 32. The storage container of claim 25 wherein said overlying sheet portion is formed by an extension of said second flexible sheet.

33. A storage container for storing a compact disc having an aperture and an edge, comprising:

a first flexible sheet;

a nonwoven fabric sheet overlaying said first flexible sheet;

a second flexible sheet overlaying said nonwoven fabric sheet opposite said first flexible sheet and joined to said first flexible sheet with said nonwoven fabric sheet disposed therebetween to define a compact disc storage area between said nonwoven fabric sheet and said second flexible sheet, said storage area being bound at its sides by first seals at first peripheral edges and a second seal at the top peripheral edge, said second flexible sheet having a generally "U"-shaped cut to define an access opening to said compact disc storage area, the ends of said cut each extending from a location adjacent said second seal to a location approximately in a center of the storage area; and, a graphics storage pocket formed adjacent to one of said first peripheral edge of said compact disc storage area, said graphics storage pocket being formed by an extension of said second flexible sheet extending peripherally outside said first peripheral edge and an overlying sheet portion affixed to the extension of said second flexible sheet to form said graphics storage pocket therebetween, said graphics storage pocket further including a graphics insert opening for receiving an elongate strip of graphics.

34. The storage container of claim 33 wherein said graphics insert opening is contained in the extension of said second flexible sheet.

35. The storage container of claim 33 wherein said graphics storage pocket is bounded by a first seal formed between the extension of said second flexible sheet and said overlying sheet portion adjacent said first peripheral edge, a second seal generally parallel to and spaced from said first seal and formed between the extension of said second flexible sheet and said overlying sheet portion, and third and fourth seals formed between the extension of said second flexible sheet and said overlying sheet portion at respective first and second ends of said graphics storage pocket and extending generally between said first and second seals.

36. The storage container of claim 35 wherein said graphics insert opening is located at one of said first and second ends of said graphics storage pocket.

37. The storage container of claim 35 wherein the third seal is generally in line with a first compact disc storage area seal formed between said first and second flexible sheets with said nonwoven fabric sheet therebetween and defining a second peripheral edge of said compact disc storage area which is substantially perpendicular to said first peripheral edge.

38. The storage container of claim 35 wherein the fourth seal is generally in line with a second compact disc storage area seal formed between said first and second flexible sheets with said nonwoven fabric sheet therebetween and defining a third peripheral edge of said compact disc storage area which is substantially perpendicular to the first peripheral edge and substantially parallel to the second peripheral edge.

39. The storage container of claim 33 wherein said graphics storage pocket is further formed by an extension of said nonwoven fabric sheet.

40. A storage container for storing a compact disc having an aperture and an edge, comprising:

a first flexible sheet;

a nonwoven fabric sheet overlaying said first flexible sheet;

a second flexible sheet overlaying said nonwoven fabric sheet opposite said first flexible sheet and joined to said first flexible sheet with said nonwoven fabric sheet disposed therebetween to define a compact disc storage area between said nonwoven fabric sheet and said second flexible sheet, said second flexible sheet having a generally "U"-shaped cut to define an access opening to said compact disc storage area; and, front and rear graphics storage pockets extending along and peripherally outside of a first peripheral edge of said compact disc storage area, said front and rear graphics storage pockets being formed from flexible sheets of material overlying each other and being connected together to form the front and rear graphics storage pockets therebetween, said front and rear graphics storage pockets further including graphics insert openings for receiving respective elongate strips of graphics.

41. The storage container of claim 40 wherein said rear graphics storage pockets is formed by an extension of said first flexible sheet.

42. The storage container of claim 40 wherein said front graphics storage pockets is formed by an extension of said second flexible sheet.

43. The storage container of claim 40 further comprising a second graphics storage pocket formed adjacent to said rear graphics storage pocket and being larger than said rear graphics storage pocket.

* * * * *